3,791,984
METHOD AND APPARATUS FOR THE
MANUFACTURE OF AN EMULSION
Hans G. Brogli, Gotthelfstrasse 42, Basel, Switzerland,
and Werner F. Brogli, Kindergartenstrasse 3, Reinach,
Switzerland
Filed May 21, 1971, Ser. No. 145,853
Claims priority, application Switzerland, June 1, 1970,
8,159/70
Int. Cl. B01j 13/00
U.S. Cl. 252—308               2 Claims

ABSTRACT OF THE DISCLOSURE

The disclosure relates to the manufacture of emulsions. A first liquid, for example a fat or wax, is heated, for example to melt it. A second, cold liquid is gradually introduced into the heated first liquid while stirring. This is made possible by introducing the second liquid in fine distribution into the draw in area of a stirring member running in the heated first liquid, and it permits the attainment of a cool, stable emulsion with no or little additional cooling. The temperature of the finished emulsion after completion of the introduction of the second liquid may be below the limit temperature up to which the emulsion is stable, and/or below the solidification temperature of the first liquid. Also disclosed are apparatus for manufacturing emulsions, comprising a mixing and/or homogenizing tool with a rotatable stirring member. At least one nozzle is disposed at the inlet side of said tool for introducing the second liquid in fine distribution into the draw in area of the stirring member.

BACKGROUND OF THE INVENTION

Figure 1:
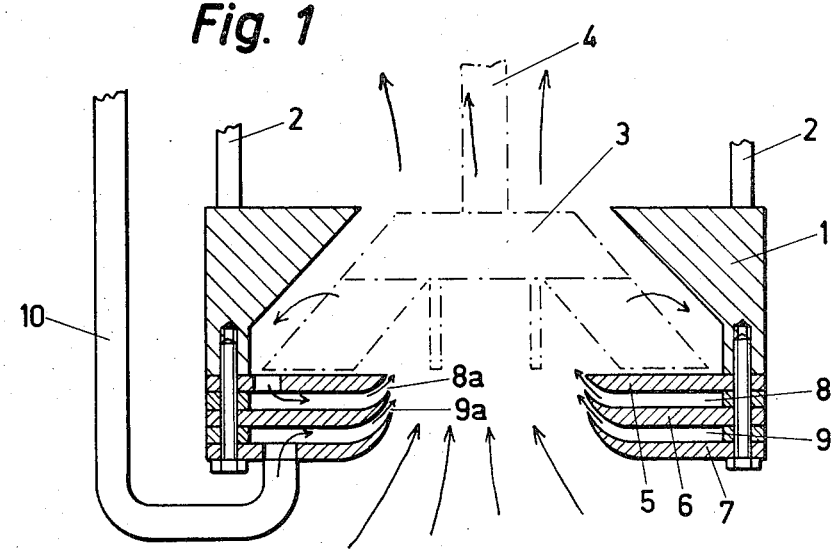

This invention relates to the manufacture of an emulsion.

In the manufacture of emulsions it is usual to insert the media to be emulsified at temperatures which differ only a little, or as far as possible not at all, from one another.

If, for example, it is desired to produce an emulsion with fat or wax it is as a rule necessary to melt the fat or wax. Then an aqueous liquid can be allowed to run gradually whilst stirring into the melt, which is heated for example at about 80° C., whereby experience has always shown that a satisfactory emulsion can only be obtained if the aqueous liquid supplied is likewise heated, for example to about 82° C. From this experience there has resulted the procedural rule already mentioned.

On the other hand it can be noted that emulsions are as a rule stable against decomposition only at temperatures below a certain specific value. This value may, for example, according to the type and quantity of emulsifiers and other additions used, be at about 25° to 30° or 35° C. If therefore according to known methods an emulsion has been produced from a fat or wax fusion and a likewise heated aqueous liquid then it is for the most part necessary to cool the emulsion with further stirring until below the stability limit in order to prevent a decomposition of the emulsion. This cooling may under certain circumstances require several hours while the actual emulsifying could frequently be carried out in a few minutes. The cooling thus makes the manufacture of the emulsion uneconomic because the emulsifying devices remain filled for a very long time and it also renders a continuous operation practically impossible. Attempts have been made to accelerate the cooling by means of cooling surfaces; this however has frequently the drawback that certain substances, for example wax, become deposited on the cooling surfaces and are thereby drawn out of the emulsion.

SUMMARY OF THE INVENTION

It has now been found that under certain circumstances and conditions the traditional procedure aforementioned can be disregarded with resultant advantages.

The invention provides a method for the manufacture of an emulsion in which a first liquid is heated to a temperature which is above the limit temperature up to which the finished emulsion is stable and above the solidification temperature of this first liquid, and then at least a second liquid is introduced into the first liquid gradually while stirring, which method is characterized according to the invention in that the second liquid, at a temperature below the said limit temperature and/or solidification temperature, is introduced in fine distribution in the entry area of a stirring member which runs in the heated first liquid.

The second liquid may be suitable introduced at a temperature which is at least 25° C. preferably at least 50° C. below the temperature at which the first liquid, for example melted fat or wax, has been heated. In most cases the second liquid, for example an aqueous liquid, may be practically cold, that is have room temperature or tap water temperature. In this way the mixture temperature of the finished emulsion after the total quantity provided of the second liquid has been introduced may be below the said limit temperature so that no more cooling with stirring is necessary.

The invention relates also to an apparatus for the carrying out of the method according to the invention. The apparatus comprises a mixing and/or homogenizing tool with an annular stator and a stirring member disposed in the stator which is rotatable in order to draw a medium from an inlet side of the stator to mix it thoroughly and thrust it out at an outlet side, and it is characterized in that at least one nozzle is disposed at the inlet side of the stator with an opening directed towards the draw in area of the stirring member, which nozzle is connected to a supply pipe for the second liquid.

The nozzle may, for example, have a fine annular gap surrounding the draw in area of the stirring member. In stead of this there could also be arranged around the draw in area a ring of nozzles in order to obtain the required fine distribution of the second liquid.

In a particularly suitable construction the nozzle having an annular gap may be formed by two annular plates which are fixed to the inlet side of the stator. The annular space bounded by these plates may be divided in the peripheral direction into two or more partial spaces which are each connected to a separate supply pipe so that several components of the second liquid or several second liquids can be introduced separately into the draw in area of the stirring tool. Furthermore the annular gap of the nozzle may be arranged surrounding the draw in area of the stirring member such that the medium drawn in by the stirring member and flowing past the gap produces a low pressure in the nozzle in order to draw in the second liquid through the supply pipe so that the use of a pumping device specifically for the second liquid can be dispensed with. In order to achieve an improved thorough mixing of the medium in the stirring tool a third annular plate may be suitably disposed on the stator which bounds a second nozzle space likewise leading into an annular gap which is directly adjacent the mixing chamber in the mixing tool and is connected to this via openings in the uppermost plate. Thereby a portion of the medium is turned around in the mixing chamber and fed again to the stirring member through the said openings and the additional annular nozzle.

The necessary fine distribution of the liquid introduced into the draw in area of the stirring member can be attained suitably also with a rotatable nozzle wheel which is disposed on the inlet side of the stator and connected to a supply pipe.

DESCRIPTION OF PREFERRED EMBODIMENTS

Figure 2:
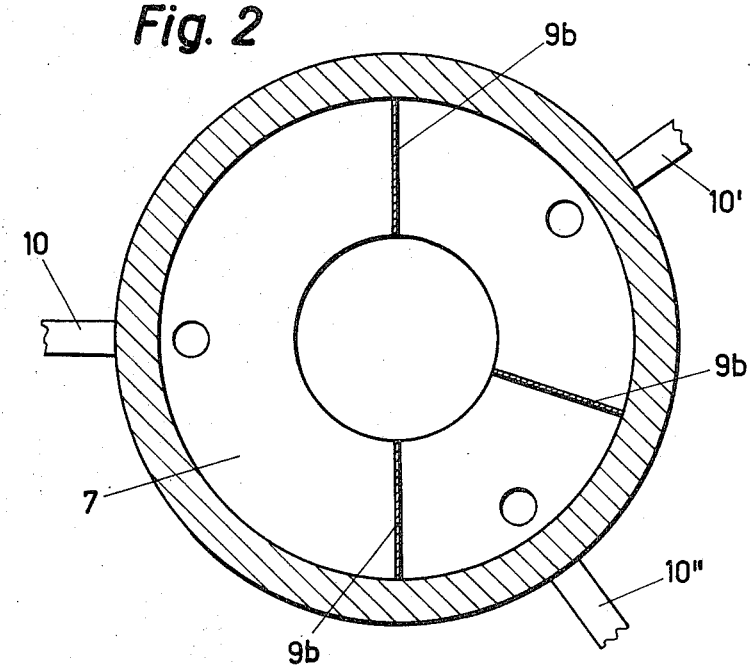

Embodiments of the method according to the invention and of the apparatus according to the invention for carrying out the method are explained by way of example in the following description with reference to the drawings. In the drawings:

FIG. 1 shows diagrammatically a vertical section through a stirring tool with a ring nozzle on the inlet side, FIG. 2 shows diagrammatically a horizontal section through a particular embodiment of the ring nozzle according to FIG. 1 and FIGS. 3, 4 and 5 show diagrammatic sections through stirring tools with nozzles arranged differently on the inlet side.

The stirring and homogenizing tool shown in FIG. 1 has an annular stator 1 which is carried via vertical bars 2 on a stand not shown and is immersed, from above, into a medium in a vessel likewise not shown. In the stator 1 a rotor or stirring member 3 is disposed which may be rotated by means of a shaft 4 around its vertical axis and then sucks, mixes and thrusts upwards medium from below as indicated by the arrows.

On the underside of the stator 1 three annular plates 5, 6 and 7 are fixed, spaced apart from one another, and enclosing between them annular chambers 8 and 9. These annular chambers are closed on the outer periphery but open inside towards the draw in area of the stirring member 3 via annular nozzle gaps 8a and 9a. The upper annular chamber 8 is in communication, via openings in the plate 5, with the mixing chamber in the stator 1 so that material to be mixed is supplied to this annular chamber. The lower annular chamber 9 is connected to a supply pipe 10 for a liquid to be emulsified which is fed in fine distribution through the corresponding annular gap 9a to the material to be mixed, which is sucked in by the stirring member 3. The annular gap may have a height of about 0.5 mm. to a few mm., for example 3 mm., according to the dimensions of the stirring tool.

In the example shown the annular gaps 8a and 9a are so arranged, and the plates 5, 6 and 7 are so formed on their inner edges, that the medium sucked by the stirring member flowing past the annular gaps produces in these a low pressure in the manner of a jet pump. This has the advantage that the liquid to be emulsified is sucked automatically through the pipe 10. It would of course also be possible to convey the liquid through the pipe 10 with pressure or maintain a vacuum above the material to be mixed, with the use of a closed vessel.

According to FIG. 2 if desired the annular space 9 above the plate 7 may be divided by means of radial partitions 9b into several sector like areas and these separate areas may be connected to separate supply pipes 10, 10$^1$ and 10$^{11}$. In this way several different liquids to be emulsified can then be fed separately simultaneously. The arrangement shown is intended for three different liquids in mutual quantity rations 50%; 30% (through the pipes 10 and 10$^1$ and 10$^{11}$ respectively).

If desired the liquid could be fed from the supply pipe also via an annularly arranged rim of individual nozzles instead of through the nozzle ring gap 9a. It is merely essential for the liquid to be emulsified to be introduced in as fine a distribution as possible directly into the draw in area of the stirring member.

Figure 3:
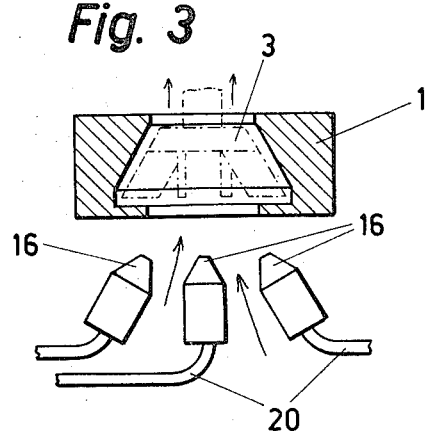
Figure 4:
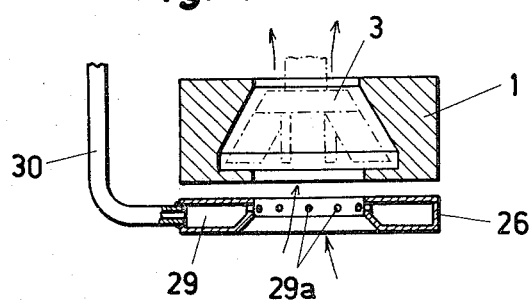
Figure 5:
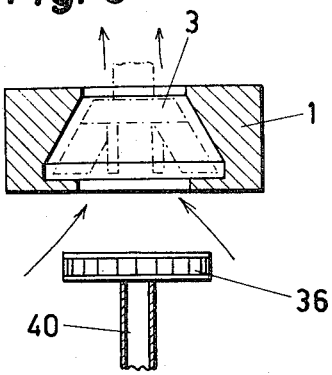

Other different possible arrangements of nozzles are shown diagrammatically, by way of example, in FIGS. 3, 4 and 5. Here also the nozzles are arranged on the inlet side of a stirring and homogenizing tool which, like that shown in FIG. 1, has a stator 1 and a rotor or stirring member 3. The nozzle openings are directed towards the draw in area of the stirring member 3 in order to introduce the second liquid to be emulsified in fine distribution in this draw in area.

According to FIG. 3 several separate single nozzles 16 are disposed on the inlet side of the stator 1, connected to individual supply pipes 20.

According to FIG. 4 an annular noozle 26 is disposed under the stator 1 and separate from this. An annular chamber 29 in this nozzle 26 is connected to a supply pipe 30. The chamber 29 is in communication with the draw in area of the stirring member 3 via a plurality of nozzle openings 29a on the inside of the ring nozzle body.

According to FIG. 5 there is used, for the supply of the liquid to be emulsified in the draw in area of the stirring member 3, a rotatable and drivable nozzle wheel 36 which is disposed under the stirring member 3 and approximately coaxially with this and to which the liquid is fed via a supply pipe 40.

Emulsions can be made as follows with the apparatus described.

There is placed in a vessel, in which the stirring tool is immersed, a first liquid which for any reason, for example because it would be congealed at room temperature, is heated to a temperature which is above the limit temperature up to which the emulsion to be made is stable and above the coagulation temperature or solidification temperature of the liquid. This first liquid may, for example, be a melted fat or wax at a temperature of about 80° C. The stirring tool is then allowed to run so that the first liquid is whirled or rolled around. A second liquid to be emulsified, for example an aqueous solution, is now supplied via the supply pipe. This second liquid has a temperature below the said limit temperature and/or below the coagulation temperature or solidification temperature of the first liquid. One may also, for example, with an arrangement according to FIG. 2 or with single nozzles according to FIG. 3 supply several liquids simultaneously; in this case at least one and preferably all of the liquids supplied should then have a temperature below the said value. As a rule the second liquid may be introduced cold, that is at about room temperature or tap water temperature.

In the manner stated immediately with the commencement of the introduction of the second liquid, so long as the first liquid is still hot, a good "parent emulsion" can be obtained. With increasing quantity of second liquid introduced the temperature of course drops gradually. Surprisingly however it is nevertheless possible without difficulties to emulsify further quantities of the second liquid after the "parent emulsion" is formed, although as a rule small quantities of suitable emulsifier must be added.

It is possible in the manner described to emulsify the second liquid in almost any desired quantity into the first liquid. One may for example, produce an emulsion from fat (first liquid) and an aqueous solution (second liquid) in which the constituent parts are present in the weight ratio of 3:1 to 1:3 and which is solid at room temperature in that the fat forms the outer phase. One may however also increase the quantity of the second liquid up to a weight ratio of 2:8 to 1:9. The emulsion then changes, that is, the fat forms the inner phase so that the finished emulsion is liquid at room temperature.

The second liquid is thus always introduced at a temperature which is substantially lower than the temperature of the heated first liquid, for example, by at least 25° C. preferably at least 50° C. lower. In most cases the second liquid may be suitably introduced at room temperature or tap water temperature. Between the heated first liquid and the cold second liquid introduced in the fine distribution directly before the mixing tool an immediate temperature compensation takes place. During the introduction of the second liquid the temperature of the mixture therefore drops gradually and after completion of this introduction the temperature is substantially below the initial temperature of the first liquid. The final temperature may be below or a little above the limit temperature at which the emulsion is stable against decomposition. If an aqueous liquid is emulsified in a melted fat the final temperature may also be below the coagulation temperature of the fat; then the finished emulsion, if the fat forms the outer phase, is already solid. Too great or too rapid a cooling of the stirring tool itself during the emulsifying is usually prevented by the frictional heat occurring therein.

According to the method described an emulsion may as a rule be produced in a few minutes. After completion of the introduction of the second liquid the emulsion is ready and no longer requires cooling while stirring in contradistinction to the cooling times of several hours which were frequently heretofore necessary in the manufacture of emulsions in accordance with known methods.

What is claimed is:

1. In a method for continuously manufacturing an emulsion from at least two immiscible liquids comprising the steps:
    (a) heating a substance selected from the group consisting of fats and waxes until it is at a temperature above the minimum temperature at which the emulsion to be manufactured is stable and at least until it is at a temperature above the solidification temperature of said substance; and
    (b) stirring said liquid substance in a manner which will suck, mix and thrust upward the substance from below and gradually while continuing the stirring introducing in fine distribution at least one aqueous liquid which is immiscible with said liquid substance into said liquid substance in the draw in area of the stirring such that the aqueous liquid is sucked into the liquid substance, said aqueous liquid at introduction being at a temperature which is at least 25° C. below the temperature of said liquid substance and the total quantity of aqueous liquid being at least 25% by weight of the finished emulsion.

2. A method according to claim 1 wherein said liquid is introduced at a temperature which is at least 50° C. below the temperature of said heated liquid substance.

References Cited

UNITED STATES PATENTS 2,424,952  7/1947  Handy _____ 252—311.5 X

JOHN D. WELSH, Primary Examiner

U.S. Cl. X.R.

252—310